United States Patent
Fukuhara

(10) Patent No.: US 9,834,629 B1
(45) Date of Patent: Dec. 5, 2017

(54) DISPERSION STABILIZER FOR SUSPENSION POLYMERIZATION AND METHOD FOR PRODUCING VINYL RESIN

(71) Applicant: KURARAY CO., LTD., Kurashiki-shi (JP)

(72) Inventor: Tadahito Fukuhara, Tainai (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/524,336

(22) PCT Filed: Nov. 11, 2015

(86) PCT No.: PCT/JP2015/081716
§ 371 (c)(1),
(2) Date: May 4, 2017

(87) PCT Pub. No.: WO2016/076349
PCT Pub. Date: May 19, 2016

(30) Foreign Application Priority Data

Nov. 12, 2014 (JP) ................................. 2014-229513

(51) Int. Cl.
| | | |
|---|---|---|
| C08F 2/20 | (2006.01) | |
| C08F 8/12 | (2006.01) | |
| C08F 18/08 | (2006.01) | |
| C08F 116/06 | (2006.01) | |
| C08L 29/04 | (2006.01) | |
| C08F 114/06 | (2006.01) | |

(52) U.S. Cl.
CPC .......... *C08F 116/06* (2013.01); *C08F 114/06* (2013.01); *C08L 29/04* (2013.01); *C08F 2/20* (2013.01); *C08F 8/12* (2013.01); *C08F 18/08* (2013.01); *C08L 2205/025* (2013.01)

(58) Field of Classification Search
None
See application file for complete search history.

(56) References Cited

U.S. PATENT DOCUMENTS

| | | | |
|---|---|---|---|
| 5,780,547 A | 7/1998 | Saeki et al. | |
| 5,977,273 A | 11/1999 | Saeki et al. | |
| 8,222,325 B2 * | 7/2012 | Michel ..................... | C08L 27/06 428/34.3 |
| 9,562,115 B2 * | 2/2017 | Fukuhara ................ | C08F 18/04 |
| 9,751,963 B2 * | 9/2017 | Fukuhara .............. | C08F 114/06 |
| 2004/0152834 A1 | 8/2004 | Kato et al. | |
| 2006/0180956 A1 | 8/2006 | Kato et al. | |
| 2013/0324655 A1 * | 12/2013 | Yoshii ..................... | C08F 14/06 524/389 |

FOREIGN PATENT DOCUMENTS

| | | |
|---|---|---|
| JP | 59-068302 A | 4/1984 |
| JP | 05-105702 A | 4/1993 |
| JP | 8-283313 A | 10/1996 |
| JP | 09-316107 A | 12/1997 |
| JP | 10-067806 A | 3/1998 |
| JP | 2002-30104 A | 1/2002 |
| JP | 2004-189889 A | 7/2004 |

OTHER PUBLICATIONS

International Search Report dated Jan. 26, 2016 in PCT/JP2015/081716 filed Nov. 11, 2015.

* cited by examiner

*Primary Examiner* — Richard A Huhn
(74) *Attorney, Agent, or Firm* — Oblon, McClelland, Maier & Neustadt, L.L.P.

(57) ABSTRACT

A dispersion stabilizer for suspension polymerization is provided that includes a vinyl alcohol-based polymer (A), wherein a 0.1 mass % concentration aqueous solution of the polymer (A) has an absorbance (a1) of less than 0.25 at a wavelength of 280 nm, the aqueous solution has an absorbance (a2) of less than 0.030 at a wavelength of 320 nm, the polymer (A) has a degree of saponification of not less than 68 mol % and not more than 98 mol %, the polymer (A) has a viscosity-average degree of polymerization of more than 1500 and less than 4500, and the polymer (A) in powder form has a YI value of not less than 5. The dispersion stabilizer is capable of producing a vinyl-based resin that is excellent in polymerization stability, has a small particle size, and has an improved bulk density.

9 Claims, No Drawings

DISPERSION STABILIZER FOR SUSPENSION POLYMERIZATION AND METHOD FOR PRODUCING VINYL RESIN

TECHNICAL FIELD

The present invention relates to a dispersion stabilizer for suspension polymerization containing a vinyl alcohol-based polymer. The present invention also relates to a method of producing a vinyl-based resin in which a vinyl-based monomer is suspension-polymerized using the dispersion stabilizer.

BACKGROUND ART

For industrial production of a vinyl-based polymer, such as a vinyl chloride resin, suspension polymerization is widely applied in which a vinyl-based monomer, such as vinyl chloride, is dispersed in an aqueous medium using a dispersion stabilizer to be polymerized in the presence of an oil-soluble catalyst. In general, factors to control the quality of a vinyl-based polymer include a rate of polymerization, a polymerization temperature, a type and an amount of a catalyst, a model of a polymerization vessel, a stirring rate, a type of a dispersing agent, and the like. Among all, the type of a dispersing agent has a significant influence. For suspension polymerization of vinyl chloride, a vinyl alcohol-based polymer (a vinyl alcohol-based polymer may be abbreviated below as a PVA) is mainly used as a dispersion stabilizer. In this case, a partially saponified PVA is preferably used as a PVA. Suspension polymerization of vinyl chloride in an aqueous medium using a PVA as a dispersion stabilizer produces a vinyl chloride resin in the form of particles.

Such a dispersion stabilizer is required to have the following performances: (1) that the number of coarse particles in a polymer produced therefrom is small; (2) that the polymer produced therefrom has a sharp particle size distribution; (3) that the polymer produced therefrom has a high bulk density and a high mass per unit volume; and the like.

Since it is difficult to satisfy the above performances with a general partially saponified PVA, various attempts have been made. For example, Patent Document 1 discloses a dispersion stabilizer made by introducing acetaldehyde into an end of a vinyl alcohol-based polymer and applying heat treatment. Although the performances of the dispersion stabilizer are improved by the heat treatment compared with conventional products, they do not fully satisfy the above required performances.

PRIOR ART DOCUMENT

Patent Document

Patent Document 1: JP 8-283313 A

SUMMARY OF THE INVENTION

Problems to be Solved by the Invention

It is an object of the present invention to provide a dispersion stabilizer for suspension polymerization and a method of producing a vinyl-based resin that are capable of satisfying the performances from (1) to (3) above and particularly obtaining a vinyl-based resin excellent in polymerization stability with a small particle size and a high bulk density.

Means for Solving the Problems

In view of the above current circumstances, the present inventor has made extensive investigations to find that the above problems were solved by a dispersion stabilizer for suspension polymerization containing a PVA (A), wherein an absorbance of an aqueous solution thereof at a specific wavelength, a degree of saponification, a viscosity-average degree of polymerization, and a YI value in powder form fall within specific ranges.

That is, the present invention relates to:
[1] a dispersion stabilizer for suspension polymerization, comprising a vinyl alcohol-based polymer (A), wherein a 0.1 mass % concentration aqueous solution of the polymer (A) has an absorbance (a1) of less than 0.25 at a wavelength of 280 nm, the aqueous solution has an absorbance (a2) of less than 0.030 at a wavelength of 320 nm, the polymer (A) has a degree of saponification of not less than 68 mol % and not more than 98 mol %, the polymer (A) has a viscosity-average degree of polymerization of more than 1500 and less than 4500, and the polymer (A) in powder form has a YI value of not less than 5;
[2] the dispersion stabilizer for suspension polymerization according to [1], further comprising a vinyl alcohol-based polymer (B), wherein a 0.1 mass % concentration aqueous solution of the polymer (B) has an absorbance (b1) of not less than 0.25 at a wavelength of 280 nm, the aqueous solution has an absorbance (b2) of not less than 0.030 at a wavelength of 320 nm, the polymer (B) has a degree of saponification of not less than 65 mol % and not more than 82 mol %, and the polymer (B) has a viscosity-average degree of polymerization of not less than 500 and not more than 1500;
[3] the dispersion stabilizer for suspension polymerization according to [2], wherein a mass ratio (A/B) of the vinyl alcohol-based polymer (A) to the vinyl alcohol-based polymer (B) is not less than 6/94 and not more than 60/40;
[4] a method of producing a vinyl-based resin, comprising suspension-polymerizing a vinyl-based monomer in an aqueous medium using the dispersion stabilizer for suspension polymerization according to any one of [1] to [3];
[5] the method of producing a vinyl-based resin according to [4], wherein a mass ratio (vinyl-based monomer/aqueous medium) of the vinyl-based monomer to the aqueous medium, which are used for suspension polymerization, is not less than 0.75;
[6] the method of producing a vinyl-based resin according to [4] or [5], wherein the vinyl-based monomer is vinyl chloride.

Effects of the Invention

Suspension polymerization of a vinyl-based monomer using a dispersion stabilizer for suspension polymerization of the present invention produces a vinyl-based resin satisfying the required performances. In particular, the dispersion stabilizer for suspension polymerization of the present invention provides a vinyl-based resin that is excellent in polymerization stability with a small particle size and an improved bulk density.

MODES FOR CARRYING OUT THE INVENTION

<Dispersion Stabilizer for Suspension Polymerization>

A dispersion stabilizer for suspension polymerization of the present invention contains a vinyl alcohol-based polymer (A), wherein a 0.1 mass % concentration aqueous solution of the polymer (A) has an absorbance (a1) of less than 0.25 at a wavelength of 280 nm, the aqueous solution has an absorbance (a2) of less than 0.030 at a wavelength of 320 nm, the polymer (A) has a degree of saponification of not less than 68 mol % and not more than 98 mol %, the polymer (A) has a viscosity-average degree of polymerization of more than 1500 and less than 4500, and the polymer (A) in powder form has a YI value of not less than 5.

Here, attribution of the absorption band at the above wavelengths is as described in JP 2004-250695 A and the like; the absorption at a wavelength of 280 nm is attributed to the structure of —CO—(CH=CH)$_2$— in the PVA and the absorption at a wavelength of 320 nm is attributed to the structure of —CO—(CH=CH)$_3$— in the PVA.

[PVA (A)]

A 0.1 mass % concentration aqueous solution of the PVA (A) used for the present invention has an absorbance (a1) of less than 0.25 at a wavelength of 280 nm, and the aqueous solution has an absorbance (a2) of less than 0.030 at a wavelength of 320 nm. The absorbance (a1) is preferably not more than 0.20 and more preferably not more than 0.15. The absorbance (a2) is preferably not more than 0.020 and more preferably not more than 0.015. When the absorbance (a1) is not less than 0.25 or (a2) is not less than 0.030, there is a risk of not obtaining sufficient performances due to thermal degradation of the PVA itself.

From the perspective of the performances of the dispersion stabilizer, the PVA (A) used for the present invention has to have a degree of saponification of not less than 68 mol % and not more than 98 mol %. A degree of saponification of less than 68 mol % may cause the PVA (A) not soluble in water and impair the handleability. There is a further risk that suspension polymerization of the vinyl-based monomer becomes unstable and the vinyl-based resin particles produced therefrom are coarsened. In contrast, a degree of saponification of more than 98 mol % may cause decreased solubility in cold water and impair the handleability. There is a further risk that suspension polymerization of the vinyl-based monomer becomes unstable and the vinyl-based polymer particles produced therefrom are coarsened. The PVA (A) has a degree of saponification of preferably not less than 70 mol % and more preferably not less than 72 mol %. Meanwhile, the degree of saponification is preferably not more than 95 mol % and more preferably not more than 92 mol %.

The degree of saponification of the PVA (A) is measured in accordance with JIS-K6726 (1994).

The PVA (A) used for the present invention has a viscosity-average degree of polymerization of more than 1500 and less than 4500. The PVA (A) having a viscosity-average degree of polymerization of not more than 1500 causes a decrease in the stability of the suspension polymerization of the vinyl-based monomer, which is liable to coarsen the vinyl-based polymer particles produced therefrom. Further problems arise, such as not producing particles with highly uniform particle size. In contrast, the PVA (A) having a viscosity-average degree of polymerization of not less than 4500 may cause a decrease in the solubility of the PVA in water and impair the handleability. The viscosity-average degree of polymerization is preferably more than 1700 and more preferably more than 1800. Meanwhile, the viscosity-average degree of polymerization is preferably less than 4000 and more preferably less than 3500.

The viscosity-average degree of polymerization of the PVA (A) is calculated by substantially completely saponifying the PVA-based polymer, followed by acetylation to make a vinyl ester-based polymer, thereby measuring limiting viscosity in an acetone solution using Nakajima's equation (Akio Nakajima, "Kobunshi Kagaku" (Polymer Chemistry) 6 (1949)).

The PVA (A) used for the present invention in powder form has a YI (yellow index) value of not less than 5. A YI value of less than 5 causes a decrease in the stability of the suspension polymerization of the vinyl-based monomer and coarsening of the vinyl-based polymer particles produced therefrom. In addition, particles with highly uniform particle size are not produced, causing problems of a decrease in the bulk density and the like. The YI value is preferably not less than 10 and more preferably not less than 15. The upper limit of the YI value is not particularly limited. However, when the dispersion stabilizer of the present invention is used for suspension polymerization of the vinyl-based monomer, from the perspective of the hue of the vinyl-based resin produced therefrom, the YI value is preferably not more than 90 and more preferably not more than 85. The YI value may be arbitrarily adjusted by controlling saponification conditions, such as the amount of the saponification catalyst, or heat treatment conditions, such as a temperature and a time, during production of the PVA (A). Although a gas filled during heat treatment is not particularly limited, an inert gas such as nitrogen, oxygen, air, or the like may be used. Among all, heat treatment is preferably carried out in air from the perspective of convenience and further improvement of performances.

The PVA (A) is produced by polymerizing a vinyl ester monomer in accordance with a conventionally known method, saponifying the polymer thus obtained in a conventional method, and applying heat treatment to the PVA thus synthesized. For the method of polymerizing a vinyl ester monomer, a conventionally known method is applicable, such as solution polymerization, bulk polymerization, suspension polymerization, and emulsion polymerization. As the polymerization catalyst, an azo catalyst, a peroxide catalyst, a redox catalyst, or the like is appropriately selected in accordance with the polymerization method. For the saponification reaction, alcoholysis, hydrolysis, or the like is applicable that uses a conventionally known alkaline or acid catalyst. Among them, saponification reaction using methanol as a solvent and a caustic soda (NaOH) catalyst is convenient and most preferred.

The PVA (A) may be produced by optimizing heat treatment conditions. The mechanism of action when the PVA (A) of the present invention is used for suspension polymerization of vinyl chloride may be, though not clarified, assumed as follows. Heat treatment of the PVA causes dehydration reaction of hydroxyl groups in the molecule to produce an enone structure. At this point, in a PVA with a carbonyl group introduced into an end of the molecular chain, dehydration due to the heat treatment may preferentially occurs from the molecular end starting from the carbonyl group not to allow uniform introduction of an enone structure into the molecular chain. In this case, with stricter heat treatment conditions for the purpose of randomly introducing an enone structure into the molecule, more than necessary enone structures are introduced into the molecule and the solubility in water turns out to decrease. Meanwhile, the PVA (A) of the present invention randomly has enone structures in a relatively long branched chain. The PVA (A) thus readily achieves stable bonding in a loop-train-tail configuration by adsorption to the vinyl chloride monomer and subsequent graft reaction, and improvement of the protective colloid performances and the like are expected. In particular, the performances are exhibited in particle control at the end of the suspension polymerization reaction for reduction in the particle size of the vinyl-based resin produced therefrom or improvement of the bulk density.

The PVA (A) may be composed of a vinyl ester unit including units derived from various vinyl ester compounds, and examples thereof include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, and vinyl benzoate. Among them, vinyl acetate is most preferred.

For synthesis of the PVA (A) used in the present invention, additional monomer(s) may be copolymerized without departing from the spirit of the present invention. Examples of the applicable additional monomers include α-olefins such as ethylene, propylene, n-butene, and isobutylene; acrylic acid and salts thereof; acrylamide; acrylamide derivatives such as N-methylacrylamide, N-ethylacrylamide, N,N-dimethylacrylamide, diacetone acrylamide, acrylamidopropanesulfonic acid and salts thereof, acrylamidopropyldimethylamine and salts thereof or quaternary salts thereof, N-methylolacrylamide and derivatives thereof; methacrylamide; methacrylamide derivatives such as N-methylmethacrylamide, N-ethylmethacrylamide, methacrylamidopropanesulfonic acid and salts thereof, methacrylamidopropyldimethylamine and salts thereof or quaternary salts thereof, N-methylolmethacrylamide and derivatives thereof; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether, and 2,3-diacetoxy-1-vinyloxypropane; nitriles such as acrylonitrile and methacrylonitrile; vinyl halides such as vinyl chloride and vinyl fluoride; vinylidene halide such as vinylidene chloride and vinylidene fluoride; allyl compounds such as allyl acetate, 2,3-diacetoxy-1-allyloxypropane, and allyl chloride; unsaturated dicarboxylic acids such as maleic acid, itaconic acid, and fumaric acid and salts thereof or esters thereof; vinylsilyl compounds such as vinyltrimethoxysilane; and isopropenyl acetate.

For synthesis of the PVA (A), a chain transfer agent may be used, without departing from the spirit of the present invention, for the purpose of adjusting the degree of polymerization or introducing modifying moieties into an end. Examples of the chain transfer agent include thiols such as 2-hydroxyethanethiol, 3-mercaptopropionic acid, dodecanethiol, and thioacetic acid; halogenated hydrocarbons such as carbon tetrachloride, trichloroethylene, and perchloroethylene; and phosphinates such as sodium phosphinate monohydrate. Among them, thiols are preferably used. The amount of the chain transfer agent may be determined in accordance with the chain transfer constant of the chain transfer agent to be added and the target degree of polymerization of polyvinyl ester. In general, the agent is desirably added not less than 0.1 mass % and not more than 10 mass % based on the vinyl ester monomer. Here, use of aldehydes, such as acetaldehyde and propionaldehyde, as the chain transfer agent may cause difficulty in having the absorbance (a2) of less than 0.030 at a wavelength of 320 nm of the 0.1 mass % concentration aqueous solution because double bonds are prone to be chained from PVA ends due to the heat treatment after saponification.

The PVA (A) has a value (Mw/Mn) of weight-average molecular weight/number-average molecular weight of, but not particularly limited to, generally not more than 10 and preferably not more than 6.

The PVA (A) has a block character of the residual vinyl ester group of, but not particularly limited to, generally not more than 1.0, and from the perspective of polymerization stability of the vinyl-based monomer, preferably not more than 0.8.

[PVA (B)]

In the present invention, in combination with the PVA (A), a PVA (B) is preferably used where a 0.1 mass % concentration aqueous solution has an absorbance (b1) of not less than 0.25 at a wavelength of 280 nm and the aqueous solution has an absorbance (b2) of not less than 0.030 at a wavelength of 320 nm. The dispersion stabilizer of the present invention preferably further contains the PVA (B). The absorbance (b1) is more preferably not less than 0.30 and even more preferably not less than 0.40. The absorbance (b2) is more preferably not less than 0.050 and even more preferably not less than 0.15. When the absorbance (b1) is less than 0.25 or (b2) is less than 0.030, the adsorption of the PVA (B) to the vinyl-based monomer is insufficient at an initial stage of the suspension polymerization, resulting in coarsening of the vinyl-based resin particles produced therefrom and there is a risk that the bulk density decreases.

From the perspective of the performances as a dispersion stabilizer, the PVA (B) preferably has a degree of saponification of not less than 65 mol % and not more than 82 mol %. The degree of saponification is more preferably not less than 68 mol %. The degree of saponification is more preferably not more than 80 mol % and even more preferably not more than 77 mol %.

The degree of saponification of the PVA (B) is obtained by measurement in accordance with JIS-K6726 (1994).

The PVA (B) preferably has a viscosity-average degree of polymerization of not less than 500 and not more than 1500. The viscosity-average degree of polymerization is more preferably not less than 600. Meanwhile, the viscosity-average degree of polymerization is more preferably not more than 1200 and even more preferably not more than 1000.

The viscosity-average degree of polymerization of the PVA (B) is calculated by substantially completely saponifying the PVA, followed by acetylation to make a vinyl ester-based polymer, thereby measuring limiting viscosity in an acetone solution using Nakajima's equation (Akio Nakajima, "Kobunshi Kagaku" (Polymer Chemistry) 6 (1949)).

In the suspension polymerization of the vinyl-based monomer, the PVA (A) and the PVA (B) are preferably used as dispersion stabilizers. A mass ratio (NB) of the PVA (A) to the PVA (B) is preferably not less than 6/94 and not more than 60/40 and more preferably not less than 10/90 and not more than 50/50.

A method of charging the PVA (A) and the PVA (B) in a polymerization vessel is not particularly limited. They may be used by dissolving at the same time or each of them may be dissolved and charged separately. The PVA (A) or the PVA (B) may be dissolved using an organic solvent or the like.

[Other Components]

Other than the PVA (A) and the PVA (B), other various additives may be added without departing from the spirit of the present invention. Examples of the additives include PVAs generally used for suspension polymerization in an aqueous medium such as a PVA with a low degree of saponification used to enhance the plasticizer absorption of the vinyl-based resin produced therefrom; water-soluble cellulose ethers such as methylcellulose, hydroxyethylcellulose, hydroxypropylcellulose, and hydroxypropylmethylcellulose; water-soluble polymers such as gelatin; oil-soluble emulsifiers such as sorbitan monolaurate, sorbitan trioleate, glycerin tristearate, and ethylene oxide-propylene oxide block copolymer; water-soluble emulsifiers such as polyoxyethylene sorbitan monolaurate, polyoxyethylene glycerin oleate, and sodium laurate; polymerization regulators such as aldehydes, halogenated hydrocarbons, and mercaptans; polymerization inhibitors such as phenol compounds, sulfur compounds, and N-oxide compounds; pH modifiers; crosslinkers; antiseptics; antifungal agents; blocking inhibitors; and antifoaming agents. The amounts of them is, but not particularly limited to, preferably not more than 1.0 parts by mass based on 100 parts by mass of the vinyl-based monomer.

<Production of Vinyl-Based Resin>

A suitable embodiment of the present invention is a method of producing a vinyl-based resin comprising suspension-polymerizing a vinyl-based monomer in an aqueous medium using the dispersion stabilizer. Examples of the vinyl-based monomer used for the method of producing a vinyl-based resin of the present invention include vinyl halides such as vinyl chloride; vinyl esters such as vinyl acetate and vinyl propionate; acrylic acid, methacrylic acid and esters and salts thereof; maleic acid, fumaric acid, and esters and anhydrides thereof; styrene; acrylonitrile; vinylidene chloride; vinyl ether; and the like. Among these vinyl-based monomers, vinyl chloride is particularly preferred. The production method of the present invention is particularly preferably used for suspension polymerization of vinyl chloride alone or vinyl chloride together with a monomer copolymerizable with vinyl chloride. Examples of the monomer copolymerizable with vinyl chloride include vinyl esters such as vinyl acetate and vinyl propionate; (meth)acrylic acid esters such as methyl (meth)acrylate and ethyl (meth)acrylate; α-olefins such as ethylene and propylene; unsaturated dicarboxylic acids such as maleic anhydride and itaconic acid; acrylonitrile; styrene; vinylidene chloride; vinyl ether; and the like.

For suspension polymerization of the vinyl-based monomer, an oil-soluble or water-soluble polymerization initiator conventionally used for polymerization of a vinyl chloride monomer or the like, may be used. Examples of the oil-soluble polymerization initiator include percarbonate compounds such as diisopropyl peroxydicarbonate, di-2-ethylhexyl peroxydicarbonate and diethoxyethyl peroxydicarbonate; perester compounds such as t-butyl peroxyneodecanate, t-butyl peroxypivalate, t-hexyl peroxypivalate, and α-cumyl peroxyneodecanate; peroxides such as acetyl cyclohexylsulfonyl peroxide, 2,4,4-trimethylpentyl-2-peroxyphenoxy acetate, 3,5,5-trimethylhexanoyl peroxide, and lauroyl peroxide; and azo compounds such as azobis-2,4-dimethylvaleronitrile and azobis(4-2,4-dimethylvaleronitrile). Examples of the water-soluble polymerization initiator include potassium persulfate, ammonium persulfate, hydrogen peroxide, and cumene hydroperoxide. These oil-soluble or water-soluble polymerization initiators can be used alone or in combination of two or more.

The polymerization temperature for suspension polymerization of the vinyl-based monomer is not particularly limited, and it can be, of course, as low as about 20° C., or can be controlled at an elevated temperature higher than 90° C. Moreover, it is also a preferred embodiment to use a polymerization reactor equipped with a reflux condenser to enhance a heat removal efficiency of the polymerization reaction system.

The aqueous medium used for suspension polymerization of the vinyl-based monomer may contain a water-soluble organic solvent as long as not inhibiting the effects of the present invention. A water content in the aqueous medium is preferably not less than 90 mass % by mass and the aqueous solvent is more preferably water.

A mass ratio of the vinyl-based monomer to be charged to the aqueous medium for suspension polymerization of the vinyl-based monomer is not particularly limited. A lower ratio of the vinyl-based monomer to the aqueous medium generally results in more stable polymerization and lower productivity, and a higher ratio of the vinyl-based monomer to the aqueous medium results in higher productivity and more unstable polymerization. In the method of producing a vinyl-based resin of the present invention, the mass ratio (vinyl-based monomer/aqueous medium) of the vinyl-based monomer to the aqueous medium is preferably from 0.57 to 1.25 and more preferably from 0.57 to 1.11. A mass ratio (vinyl-based monomer/aqueous medium) of less than 0.57 may cause lower productivity of the vinyl-based resin produced therefrom. In contrast, a mass ratio (vinyl-based monomer/aqueous medium) of more than 1.25 may cause a decrease in the polymerization stability and production of coarse resin particles. For particular improvement of the productivity of the vinyl-based resin, the mass ratio (vinyl-based monomer/aqueous medium) of the vinyl-based monomer to the aqueous medium is preferably not less than 0.75.

Another suitable embodiment of the present invention is a method of producing a vinyl-based resin comprising suspension-polymerizing a vinyl-based monomer in an aqueous medium using the PVA (A) and the PVA (B). A method of charging the PVA (A) and the PVA (B) in a polymerization vessel is not particularly limited. A mixture of the PVA (A) and the PVA (B) may be charged or the PVA (A) and the PVA (B) may be charged separately. In this method, the dispersion stabilizer of the present invention described above is preferably used.

EXAMPLES

The present invention is described below in further detail with reference to Examples. In Examples and Comparative Examples below, "part(s)" and "%" denote, unless otherwise specified, part(s) by mass and mass %, respectively.

PVAs obtained by Production Examples below were evaluated in accordance with the following methods.

[Viscosity-Average Degree of Polymerization of PVA]

A viscosity-average degree of polymerization of each PVA was calculated by substantially completely saponifying the PVA, followed by acetylation to make a vinyl ester-based polymer, thereby measuring limiting viscosity in an acetone solution using Nakajima's equation (Akio Nakajima, "Kobunshi Kagaku" (Polymer Chemistry) 6 (1949)).

[Degree of Saponification of PVA]

A degree of saponification of each PVA was obtained by the method according to JIS K6726 (1994).

[Absorbance of Aqueous Solution]

A 0.1 mass % aqueous PVA solution was prepared to measure absorbances (optical path length of 10 mm) at wavelengths of 280 nm and 320 nm using an absorptiometer "UV2100" manufactured by Shimadzu Corporation.

[Yellow Index (YI)]

Hue of PVA: measured using a powder measurement cell in a color meter "SM-T-Hl" manufactured by Suga Test Instruments Co., Ltd.

Production Examples

Production of PVA (A1)

In a polymerization vessel, 1400 parts of vinyl acetate (hereinafter, may be abbreviated as VAc) and 600 parts of methanol were charged and the atmosphere was purged with nitrogen and then heated to the boiling point, followed by adding 0.05% azobisisobutyronitrile and 10 parts of methanol to VAc for polymerization. The polymerization was terminated at a rate of polymerization of 40%, and under a reduced pressure, methanol was added to remove the residual VAc together with the methanol to outside the system to provide a solution of polyvinyl acetate (hereinafter, may be abbreviated as PVAc) in methanol (concentration of 40%). Subsequently, saponification reaction was then initiated using sodium hydroxide as a saponification catalyst at a molar ratio of 0.0047 to PVAc in a 30% solution of PVAc in methanol at a temperature of 40° C. Gelation was found after 23 minutes and the contents were taken out once, followed by pulverization using a mixer. It was returned to 40° C. again and reacted for 1 hour in total of the reaction time at 40° C. After termination of the reaction, it was dried under a reduced pressure to remove methanol, followed by heat treatment at atmospheric pressure in air atmosphere for 1 hour at 80° C., then for 1 hour at 90° C., and further for 4 hours at 120° C. to produce PVA (A1). The PVA (A1) had a viscosity-average degree of polymerization of 1550 and a degree of saponification of 80 mol %, and a 0.1% concentration aqueous solution thereof had the absorbance (a1) of 0.008 at a wavelength at 280 nm and the absorbance (a2) of 0.004 at 320 nm, and the PVA (A1) had a YI value of 41.

Production of PVA (A2-A7, A9, A12-A14)

PVAs (A2-A7, A9, A12-A14) shown in Table 1 were produced in the same manner as PVA (A1) other than changing the polymerization conditions such as the amounts of vinyl acetate and methanol to be charged, the amount of the initiator used for polymerization, and the target rate of polymerization, the saponification conditions such as the amount of sodium hydroxide, and the heat treatment conditions such as the time and the temperature.

Production of PVA (A8, A10)

PVAs (A8, A10) shown in Table 1 were produced in the same manner as PVA (A1) other than using acetaldehyde as a chain transfer agent for polymerization in the same manner as the method described in JP 8-283313 A to control the degree of polymerization by the amount to be used and changing the polymerization conditions such as the amounts of vinyl acetate and methanol to be charged, the amount of the initiator used for polymerization, and the target rate of polymerization, the saponification conditions such as the amount of sodium hydroxide, and the heat treatment conditions such as the time and the temperature.

Production of PVA (A11)

PVA (A11) was obtained without heat treatment in the production procedure of PVA (A1). PVA (A11) was produced in the same manner as PVA (A1) other than not performing heat treatment.

Production of PVA (B1-B3)

PVAs (B1-B3) shown in Table 1 were produced in the same manner as PVA (A8) other than changing, in the same manner as the method described in JP 8-283313 A, the polymerization conditions such as the amount of acetaldehyde used for polymerization, the amounts of vinyl acetate and methanol to be charged, the amount of the initiator used for polymerization, and the target rate of polymerization, the saponification conditions such as the amount of sodium hydroxide, and the heat treatment conditions such as the time and the temperature.

TABLE 1

| | Vinyl Alcohol-Based Polymer (A) | | | | | Vinyl Alcohol-Based Polymer (B) | | | | | Amount Used for Suspension Polymerization (ppm/Vinyl-Based Compound) | |
|---|---|---|---|---|---|---|---|---|---|---|---|---|
| | | Absorbance | Absorbance | | Degree of Saponification | Degree of Polymerization | | Absorbance | Absorbance | Degree of Saponification | Degree of Polymerization | Mass Ratio | | |
| | Type | (a1) | (a2) | YI | (mol %) | zation | Type | (b1) | (b2) | (mol %) | zation | (A/B) | (A) | (B) |
| Formulation Example 1 | (A1) | 0.008 | 0.004 | 41 | 80 | 1550 | | | None | | | 100/0 | 880 | 0 |
| Formulation Example 2 | (A1) | 0.008 | 0.004 | 41 | 80 | 1550 | (B1) | 0.581 | 0.444 | 72 | 700 | 27/73 | 240 | 640 |
| Formulation Example 3 | (A2) | 0.008 | 0.004 | 39 | 80 | 1750 | (B1) | 0.581 | 0.444 | 72 | 700 | 27/73 | 240 | 640 |
| Formulation Example 4 | (A3) | 0.008 | 0.004 | 41 | 80 | 2000 | (B1) | 0.581 | 0.444 | 72 | 700 | 27/73 | 240 | 640 |
| Formulation Example 5 | (A4) | 0.009 | 0.004 | 38 | 88 | 2400 | (B1) | 0.581 | 0.444 | 72 | 700 | 27/73 | 240 | 640 |
| Formulation Example 6 | (A5) | 0.008 | 0.004 | 39 | 95 | 2400 | (B1) | 0.581 | 0.444 | 72 | 700 | 27/73 | 240 | 640 |
| Formulation Example 7 | (A6) | 0.005 | 0.002 | 9 | 88 | 2400 | (B1) | 0.581 | 0.444 | 72 | 700 | 27/73 | 240 | 640 |
| Formulation Example 8 | (A7) | 0.013 | 0.007 | 60 | 88 | 3800 | (B1) | 0.581 | 0.444 | 72 | 700 | 27/73 | 240 | 640 |
| Formulation Example 9 | (A8) | 0.202 | 0.025 | 14 | 88 | 1550 | (B1) | 0.581 | 0.444 | 72 | 700 | 27/73 | 240 | 640 |
| Formulation Example 10 | (A4) | 0.009 | 0.004 | 38 | 88 | 2400 | (B2) | 0.401 | 0.196 | 72 | 700 | 27/73 | 240 | 640 |
| Formulation Example 11 | (A4) | 0.009 | 0.004 | 38 | 88 | 2400 | (B3) | 0.302 | 0.079 | 72 | 700 | 27/73 | 240 | 640 |
| Formulation Example 12 | (A4) | 0.009 | 0.004 | 38 | 88 | 2400 | (B1) | 0.581 | 0.444 | 72 | 700 | 9/91 | 79 | 801 |
| Formulation Example 13 | (A4) | 0.009 | 0.004 | 38 | 88 | 2400 | (B1) | 0.581 | 0.444 | 72 | 700 | 55/45 | 484 | 396 |
| Formulation Example 14 | (A4) | 0.009 | 0.004 | 38 | 88 | 2400 | (B1) | 0.581 | 0.444 | 72 | 700 | 27/73 | 40 | 640 |

TABLE 1-continued

| | Vinyl Alcohol-Based Polymer (A) | | | | | Vinyl Alcohol-Based Polymer (B) | | | | | Amount Used for Suspension Polymerization (ppm/Vinyl-Based Compound) | |
|---|---|---|---|---|---|---|---|---|---|---|---|---|
| | Type | Absorbance (a1) | Absorbance (a2) | YI | Degree of Saponification (mol %) | Degree of Polymerization | Type | Absorbance (b1) | Absorbance (b2) | Degree of Saponification (mol %) | Degree of Polymerization | Mass Ratio (A/B) | (A) | (B) |
| Formulation Example 15 | (A9) | 0.008 | 0.004 | 40 | 74 | 800 | (B1) | 0.581 | 0.444 | 72 | 700 | 27/73 | 240 | 640 |
| Formulation Example 16 | (A10) | 0.452 | 0.201 | 40 | 74 | 800 | (B1) | 0.581 | 0.444 | 72 | 700 | 27/73 | 240 | 640 |
| Formulation Example 17 | (A11) | 0.002 | 0.001 | 2 | 80 | 1550 | (B1) | 0.581 | 0.444 | 72 | 700 | 27/73 | 240 | 640 |
| Formulation Example 18 | (A12) | 0.008 | 0.004 | 41 | 65 | 2400 | (B1) | 0.581 | 0.444 | 72 | 700 | 27/73 | 240 | 640 |
| Formulation Example 19 | (A13) | 0.008 | 0.004 | 41 | 99 | 2400 | (B1) | 0.581 | 0.444 | 72 | 700 | 27/73 | 240 | 640 |
| Formulation Example 20 | (A14) | 0.008 | 0.004 | 40 | 74 | 5000 | (B1) | 0.581 | 0.444 | 72 | 700 | 27/73 | 240 | 640 |

Example 1

In a 5 liter autoclave, 100 parts of a deionized aqueous solution in which PVA (A1) was dissolved in an amount of 880 ppm relative to vinyl chloride were charged, and deionized water was additionally charged to have 1200 parts of deionized water in total. Then, 0.65 parts of a 70% solution of cumyl peroxyneodecanoate in toluene and 1.05 parts of a 70% solution of t-butyl peroxyneododecanoate in toluene were charged in the autoclave. An operation in which nitrogen was introduced into the autoclave to produce a pressure of 0.2 MPa and then the nitrogen was purged was repeated 5 times in total. Inside the autoclave was thus sufficiently purged with nitrogen to remove oxygen, followed by charging of 940 parts of vinyl chloride. The contents in the autoclave were raised in temperature to 57° C. to initiate polymerization of the vinyl chloride monomer with stirring. The pressure in the autoclave was 0.80 MPa at the beginning of the polymerization. Approximately 3.5 hours after the initiation of polymerization, the polymerization was terminated at a pressure in the autoclave of 0.70 MPa and unreacted vinyl chloride monomers were removed. The polymerization reaction product was then taken out and dried at 65° C. for 16 hours to obtain vinyl chloride resin particles. The particles thus obtained were evaluated in the methods below.

(Evaluation of Vinyl Chloride Resin Particles)

The vinyl chloride resin particles thus obtained were evaluated for (1) an average particle size, (2) a particle size distribution, and (3) a bulk density in accordance with the following methods. Evaluation results are shown in Table 2.

(1) Average Particle Size

Using Tyler-mesh screens, a particle size distribution was measured by dry screen analysis in accordance with JIS Z8815. From the results, an average particle size was calculated using a Rosin-Rammler plot. Evaluation results are shown in Table 2.

(2) Particle Size Distribution

In the vinyl chloride polymer particles thus obtained, a content of JIS standard screen 42 mesh-on resin particles was indicated by mass %. Evaluation results are shown in Table 2.
A: less than 0.5%
B: not less than 0.5% and less than 1%
C: not less than 1%

In the vinyl chloride polymer particles thus obtained, a content of JIS standard screen 60 mesh-on resin particles was indicated by mass %.
A: less than 5%
B: not less than 5% and less than 10%
C: not less than 10%

Smaller values of the contents of both 42 mesh-on resin particles and 60 mesh-on resin particles indicate to contain fewer coarse particles, to have a sharper particle size distribution, and to have more excellent polymerization stability.

(3) Bulk Density

A bulk density of the vinyl chloride resin was measured in accordance with JIS K6721. Evaluation results are shown in Table 2.

Example 2

Suspension polymerization of vinyl chloride was carried out in the same manner as that in Example 1 other than using a deionized aqueous solution in which PVA (A1) (240 ppm based on vinyl chloride) and PVA (B1) (640 ppm based on vinyl chloride) were dissolved, instead of the deionized aqueous solution of PVA (A1), to produce vinyl chloride resin particles. Evaluation results of the vinyl chloride resin particles are shown in Table 2.

Examples 3-14

Suspension polymerization of vinyl chloride was carried out in the same manner as that in Example 2 other than changing the type and amount of the PVA (A) and the PVA (B) to be used as shown in Table 1 to produce vinyl chloride resin particles. Evaluation results of the vinyl chloride resin particles are shown in Table 2.

Comparative Examples 1-6

Suspension polymerization of vinyl chloride was carried out in the same manner as that in Example 2 other than changing the type and amount of the PVA (A) and the PVA (B) to be used as shown in Table 1 to produce the PVA (A) and the PVA (B) vinyl chloride resin particles. Evaluation results of the vinyl chloride resin particles are shown in Table 2.

TABLE 2

Evaluation Results of Vinyl Chloride Resin Particles

| | Formulation | Vinyl Chloride Monomer/ Water | Average Particle Size (μm) | Particle Size Distribution 42 mesh on | 60 mesh on | Bulk Density (g/cc) |
|---|---|---|---|---|---|---|
| Example 1 | Formulation Example 1 | 940/1200 | 135.2 | B | A | 0.489 |
| Example 2 | Formulation Example 2 | 940/1200 | 124.3 | A | A | 0.491 |
| Example 3 | Formulation Example 3 | 940/1200 | 126.7 | A | A | 0.502 |
| Example 4 | Formulation Example 4 | 940/1200 | 130.5 | A | A | 0.513 |
| Example 5 | Formulation Example 5 | 940/1200 | 131.5 | A | A | 0.546 |
| Example 6 | Formulation Example 6 | 940/1200 | 138.4 | B | A | 0.552 |
| Example 7 | Formulation Example 7 | 940/1200 | 137.9 | A | A | 0.523 |
| Example 8 | Formulation Example 8 | 940/1200 | 127.1 | B | A | 0.565 |
| Example 9 | Formulation Example 9 | 940/1200 | 152.9 | B | A | 0.475 |
| Example 10 | Formulation Example 10 | 940/1200 | 135.1 | A | A | 0.530 |
| Example 11 | Formulation Example 11 | 940/1200 | 139.8 | A | A | 0.520 |
| Example 12 | Formulation Example 12 | 940/1200 | 140.9 | A | A | 0.501 |
| Example 13 | Formulation Example 13 | 940/1200 | 146.9 | A | A | 0.565 |
| Example 14 | Formulation Example 14 | 940/1200 | 152.3 | B | A | 0.471 |
| Comparative Example 1 | Formulation Example 15 | 940/1200 | 182.5 | C | B | 0.432 |
| Comparative Example 2 | Formulation Example 16 | 940/1200 | 170.2 | C | B | 0.443 |
| Comparative Example 3 | Formulation Example 17 | 940/1200 | 199.2 | C | B | 0.435 |
| Comparative Example 4 | Formulation Example 18 | 940/1200 | Not Capable of Suspension Polymerization due to Insolubility in Water | | | |
| Comparative Example 5 | Formulation Example 19 | 940/1200 | 210.2 | C | C | 0.441 |
| Comparative Example 6 | Formulation Example 20 | 940/1200 | Not Capable of Suspension Polymerization due to Insolubility in Water | | | |

As shown in Table 2, in the cases of using the dispersion stabilizers of PVA (A) that had an absorbance of a 0.1 mass % concentration aqueous solution, a degree of saponification, a viscosity-average degree of polymerization, and a YI value in powder form within predetermined ranges, vinyl chloride resin particles were produced that exhibited very stable polymerization, even in the conditions of a high ratio of vinyl-based monomers liable to cause instability, contained fewer coarse particles, and had a high bulk density (Examples 1-14). In particular, the dispersion stabilizers of the PVA (A) and the PVA (B) had the above properties even more excellent (Examples 2-14). Accordingly, the production method of the present invention has extremely high industrial utility.

In all the cases of using PVA (A9) with a degree of polymerization of 800 (Comparative Example 1), using PVA (A10) producing a 0.1 mass % concentration aqueous solution with an absorbance (a1) of 0.452 at a wavelength of 280 nm and an absorbance (a2) of 0.201 at a wavelength of 320 nm (Comparative Example 2), and using PVA (A11) having a YI value of 2 (Comparative Example 3), the vinyl chloride resin particles thus obtained had a large particle size and were coarse, had greater 42 mesh-on and 60 mesh-on ratios indicating unstable polymerization, and had a low bulk density.

Although suspension polymerization of vinyl chloride were attempted using PVA (A12) with a degree of saponification of 65 mol %, PVA (A12) was not dissolved in water possibly because of the low degree of saponification and it was not possible to carry out polymerization (Comparative Example 4). In the case of using PVA (A13) with a degree of saponification of 99 mol %, the vinyl chloride resin particles thus obtained had a large particle size and were coarse, had greater 42 mesh-on and 60 mesh-on ratios indicating unstable polymerization, and had a low bulk density (Comparative Example 5). Although suspension polymerization of vinyl chloride was attempted using PVA (A14) with a viscosity-average degree of polymerization of 5000, PVA (A14) was not dissolved in water possibly because of the low viscosity-average degree of polymerization and it was not possible to carry out polymerization (Comparative Example 6).

The invention claimed is:
1. A dispersion stabilizer, comprising a vinyl alcohol-comprising polymer (A),
  wherein
  a 0.1 mass % concentration aqueous solution of the polymer (A) has an absorbance (a1) of less than 0.25 at a wavelength of 280 nm, the aqueous solution has an absorbance (a2) of less than 0.030 at a wavelength of 320 nm, the polymer (A) has a degree of saponification of not less than 68 mol % and not more than 98 mol %, the polymer (A) has a viscosity-average degree of polymerization of more than 1500 and less than 4500, and the polymer (A) in powder form has a YI value of not less than 5.

2. The dispersion stabilizer according to claim 1, further comprising a vinyl alcohol-comprising polymer (B), wherein a 0.1 mass % concentration aqueous solution of the polymer (B) has an absorbance (b1) of not less than 0.25 at a wavelength of 280 nm, the aqueous solution has an absorbance (b2) of not less than 0.030 at a wavelength of 320 nm, the polymer (B) has a degree of saponification of not less than 65 mol % and not more than 82 mol %, and the polymer (B) has a viscosity-average degree of polymerization of not less than 500 and not more than 1500.

3. The dispersion stabilizer according to claim 2, wherein a mass ratio (AB) of the vinyl alcohol-comprising polymer (A) to the vinyl alcohol-comprising polymer (B) is not less than 6/94 and not more than 60/40.

4. A method of producing a vinyl-based resin, comprising suspension-polymerizing a vinyl-comprising monomer in an aqueous medium with the dispersion stabilizer according to claim 1.

5. The method of producing a vinyl-based resin according to claim 4, wherein a mass ratio (vinyl-comprising monomer/aqueous medium) of the vinyl-comprising monomer to the aqueous medium is not less than 0.75.

6. The method of producing a vinyl-based resin according to claim 4, wherein the vinyl-comprising monomer is vinyl chloride.

7. A method of producing a vinyl-based resin, comprising suspension-polymerizing a vinyl-comprising monomer in an aqueous medium with the dispersion stabilizer according to claim 2.

8. A method of producing a vinyl-based resin, comprising suspension-polymerizing a vinyl-comprising monomer in an aqueous medium with the dispersion stabilizer according to claim 3.

9. The method of producing a vinyl-based resin according to claim 5, wherein the vinyl-comprising monomer is vinyl chloride.

* * * * *